Figure 1:
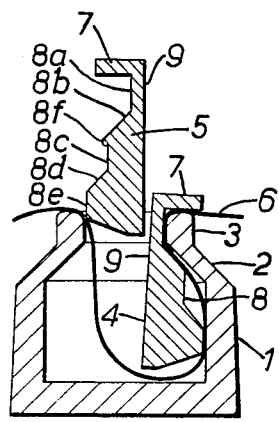

United States Patent [19]
Cresswell

[11] 3,818,550
[45] June 25, 1974

[54] RETENTION DEVICES FOR SHEET MATERIAL

[76] Inventor: Harold William Cresswell, Treona Nurseries, Staunton, near Gloucester, England

[22] Filed: June 5, 1972

[21] Appl. No.: 259,848

[30] Foreign Application Priority Data
June 8, 1971 Great Britain................ 19320/71

[52] U.S. Cl. ............................................ 24/243 K
[51] Int. Cl............................................. A44b 21/00
[58] Field of Search ......... 24/243 K, 243 M, 243 N, 24/30.5 L, 30.5 R, 72.5

[56] References Cited
UNITED STATES PATENTS

| | | | |
|---|---|---|---|
| 1,088,465 | 2/1914 | Sippel et al. | 24/243 N UX |
| 2,055,251 | 9/1936 | Duvall | 24/243 N X |
| 3,426,412 | 2/1969 | Streng et al. | 24/243 K |
| 3,527,284 | 9/1970 | Nelson et al. | 24/243 N X |

FOREIGN PATENTS OR APPLICATIONS

| | | | |
|---|---|---|---|
| 1,245,940 | 10/1960 | France | 24/243 K |

OTHER PUBLICATIONS
1,810,129, German Printed Application, 7/1970, Auer.

Primary Examiner—Donald A. Griffin
Attorney, Agent, or Firm—Young & Thompson

[57] ABSTRACT

A retention device for gripping, anchoring and/or tensioning sheet material, particularly plastics sheeting, comprises a wedge the thin end of which is extended for manipulation, the wedge including the extension thereof being split in at least two parts for successive insertion through a slot with sheet material wrapping surfaces of the wedge.

The slot may be formed in a structure to which the material is to be secured or in a support member to be secured to the structure.

In its preferred form, the device comprises flexible strips of angle section with an inner flange face having a ramp and step profile, two strips being inserted successively and back-to-back in a channel-section strip support to form a wedge looping the sheet material in the channel. Spaced wedge expanders may be pressed between the strips.

The device is particularly applicable for retention of plastics sheeting such as sheet polythene in canopies, hoods, greenhouses shelters and wind breaks.

7 Claims, 8 Drawing Figures

PATENTED JUN25 1974 3,818,550

RETENTION DEVICES FOR SHEET MATERIAL

This invention relates to retention devices for sheet material, applicable particularly, but not solely, to plastics sheet material and to the gripping, anchoring and/or tensioning of such material for example in canopies, hoods, greenhouse shelters and wind breaks.

According to the invention a retention device comprises a wedge the thin end of which is extended for manipulation, the wedge including the extension thereof being in at least two parts for successive insertion through a slot with sheet material wrapping surfaces of the wedge. The slot may be formed in a member of a structure to which the material is to be secured, or between members of such a structure. Preferably however the slot is provided in a support member or between support members forming part of the retention device and adapted to be bolted or otherwise secured to a structure. The slot is preferably provided by opposed faces converging to the orifice through which the parts of the wedge are inserted, said faces cooperating with the wedge faces. A channel member with inwardly inclined or inturned flanges conveniently provides such a slot.

The wedge may extend in length, transversely of its ramp-like cross section, to grip a substantial width of the sheet material and may cooperate with a channel member of similar length or a run of channel members making up the length. The ramp surfaces of the wedge are preferably symmetrical about the plane of contact of the parts of the wedge and the two parts may be of the same shape.

The retention device can be used on a spread sheet of material to give line fixing across the sheet, the sheet being looped round the wedge or round a row of wedges. It can also provide edge fixing, the sheet material being wrapped round the wedge or alternatively round one of two parts of the wedge so as to be clamped between the parts. Two sheets each edge fixed in this alternative way can be joined together by one retention device or row of retention devices, as an alternative to lapping the sheets together round the wedge. In either case a watertight joint with plastic sheeting is obtainable.

Means may be provided for expanding the wedge by forcing the parts of the wedge apart. By such means, the wedge can be tightened or locked in the slot. Sheet material can then be gripped and tensioned more positively, particularly to avoid or reduce creep of material under prolonged varying stress.

Figure 2:
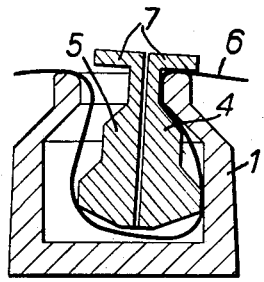
Figure 3:
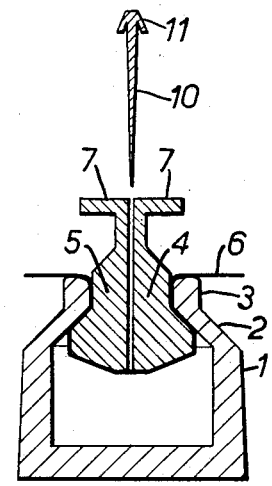
Figure 4:
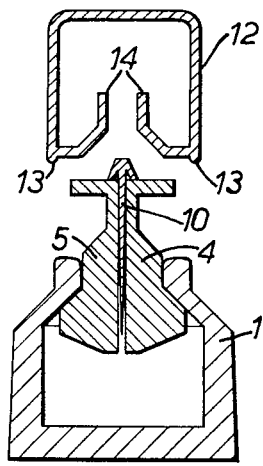
Figure 5:
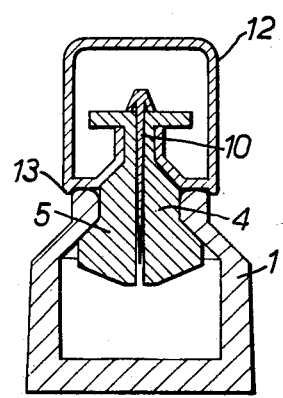
Figure 6:
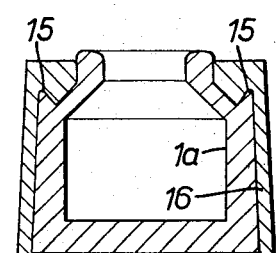
Figure 7:
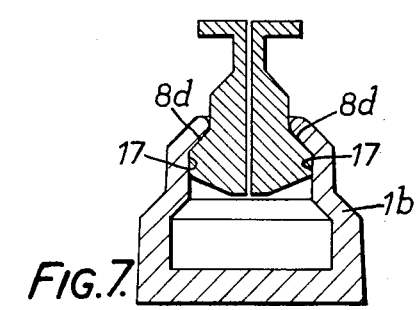
Figure 8:
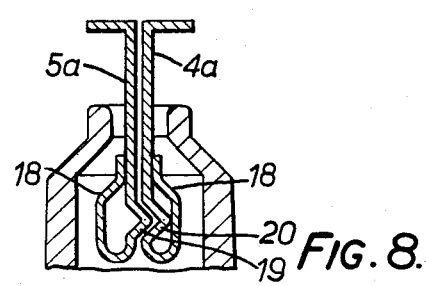

A retention device for sheet polythene spread over a canopy, tent or greenhouse structure, together with a number of variants, all embodying the invention, will now be described, by way of example, with reference to the accompanying drawings, in which:

FIGS. 1, 2 and 3 are views of the device in successive stages of assembly for use in retaining and tensioning the sheet material, FIGS. 4 and 5 illustrate the incorporation of wedge expanders and capping strips, FIG. 6 shows a modified form of channel section and illustrates possible fixing methods, FIG. 7 shows another variant form of channel section, and FIG. 8 illustrates a variant form of wedge.

Referring to FIGS. 1, 2 and 3, the device comprises a length of metal strip 1 in channel section, the flange edge portions of which have an inwardly inclined part 2 and parallel ends 3, this channel section being intended to be secured at intervals to an outer face of the structure beneath the sheet polythene, for example by screws or pop rivets through the base portion. Into the channel-section strip 1 is introduced a split wedge in two similar parts 4,5, the parts being inserted in succession over a loop of the polythene sheet 6, as shown in FIGS. 1 and 2. Each part comprises a length of moulded plastics strip of angle section having a narrow flange 7 and a ramped projecting formation 8 along with the inner face of the other flange 9. The ramped flanges 9 of the two wedge parts 3 and 4 are inserted back to back in the channel-section strip 1, looping the polythene sheet 6 in the channel section, and, when the sheet is tensioned, wedging themselves against the inturned flanges 2 of the channel-section strip 1, as shown in FIG. 3. The profile of each of the plastics strips 4 and 5 is, as designated on strip 5 in FIG. 1 only, made up of a number of functional parts. Firstly, there is a flat $8a$, to provide an extension of the thin end of the wedge for manipulation and to allow the strips to move into the channel-section strip 1 clear of the walls thereof as in FIG. 2. Secondly, there is a guiding ramp $8b$ to a flat $8c$ so that the wedge comprising strips 4 and 5 can be lifted from the position shown in FIG. 2 to the wedging position of FIG. 3, wherein the flats $8c$ are aligned with the parallel inside faces of the channel-section strip 1 at the extreme flange edges of the latter to prevent rocking movement of the wedge in use. Thirdly, there is a ramp $8d$ providing the wedge face cooperating with the inclined wall portion 2 of the channel-section strip 1. The profile is completed by an end face $8e$ over which the loop of polythene is stretched in a curved path or in a succession of obtuse angles as is clearly shown in FIG. 3. Furthermore, it is advantageous to provide a slight protuberance $8f$ in the profile at the junction of the ramp $8b$ and the flat $8c$, this protuberance being shown exaggerated in size in FIG. 1 and being formed by a narrow rib of very small height. The extreme edges of the channel section are rounded, or may have rounded lips, to present a smoothly contoured surface to the tensioned sheet material.

In the spreading of sheets of polythene over a frame to which channel-section metal strips 1 have been fixed, each sheet is as a first step held slackly spread, by inserting the plastics wedging strips 4,5 in the channel sections to loop the polythene therein. Successive sheets, when used, are lapped and looped together at appropriately placed channel sections. The sheets can then be tensioned by pressing down the wedging strips to loosen the wedge while applying tension to the sheet material and then allowing the wedging strips to rise and grip the sheet material. Thus the material can be worked into final position and equally can be removed and replaced or readjusted at any time, the material remaining unmarked. Under tension the wedging strips lift or pop-up to the wedging position, with the ribs $8f$ serving in a subsidiary way to snap over the lips of the channel sections and so to tend to maintain the wedging when tension is temporarily lost during the sheet spreading or under in-use stresses on the sheet.

In the covering of relatively large areas, tensioning is best performed at each channel section in turn as the sheet material is spread. The wedging provides a watertight joint between two sheets lapped together and maintains tension without slippage in practically all conditions. Over large flat areas, however, creepage or micro-slip may occur due to elastic effects in the sheet material in conditions of sustained high wind or alternating stress. Avoidance of such slippage can be ensured by the use of wedge expanders comprising, as shown in FIG. 3, short lengths of plastics or metal strip 10, of tapering cross-section with a head 11, driven between the plastics strips 4,5 of the wedge at intervals along the length thereof. The ribs 8f in this case assist in holding the wedge in position while the wedge expanders are inserted.

As shown in FIGS. 4 and 5 a moulded capping strip 12 of yielding plastics material may be provided and applied over and along the runs of wedging. As shown the capping strip 12 is of channel section with edges 13 overlapping the channel-section flange ends and re-entrant webs 14 fitting beneath the flanges 7 of the wedge strips 4 and 5.

Materials and dimensions chosen for use in the arrangements of FIGS. 1 to 5 to suit a wide range of applications are as follows:

Channel-section of aluminium alloy extrusion to BS1474/HE30TF, base width about 20 mm, flange height 17 – 18 mm and root thickness 2.7 mm with wedging faces inclined at 45°, the channel section being of strength to exhibit elastic bending under a moment of 100 ft.lb. and supplied in standard lengths.

Plastics wedging strips extruded of hard P.V.C. or nylon (to be flexible but to be little affected by temperature) and of dimensions to match the channel section, flexible to follow the channel section and for rounded corners and supplied in coiled lengths, the rib height being 0.005 inch.

Wedge expanders and capping strips of extruded A.B.S. the wedge expanders being three-fourths inch wide for use spaced at 6-inch intervals.

Sheet polythene or other sheet material held to a load up to 250 lb. per foot run, with optimum sheet thickness of about 0.005 inch, usable with sheet thicknesses between 0.001 inch and 0.015 inch.

Lengths of the channel-section strip 1 may be fixed to the supporting framework so that they butt end-to-end to receive wide sheets of polythene and wedging strips cut to length, or they may be butt-jointed together by clips or brackets which in some cases may suffice for attachment of the channel sections to the frame. Alternatively for covered structures such as small greenhouses the channel-section strip may itself constitute the framework or part of the framework.

In FIG. 6 there is shown a channel section 1a with external shoulders 15 such that the section may be inserted endwise and held in a bracket 16. The bracket may join two lengths of the channel section end-to-end. More importantly, the bracket may be an angle bracket used as a coupling and shaped to receive the ends of two or three lengths of channel section mutually at right angles. Hence frames in two or three dimensions may be assembled using channel-section members in which sheet material may be held under tension to cover the frame.

As a further alternative the channel sections may be directly formed into rectangular or other two-dimensional frames or into three-dimensional structures by bolting, riveting or welding, to provide not only the structure but also retention means for sheet covering.

Whereas in the arrangement of FIGS. 1 to 5, flats 8c on the two wedging strips 8 cooperate with parallel faces of the channel section 1 to prevent rocking movement of the wedge, variant arrangements are possible.

In FIG. 7, the channel section 1b is shown with parallel faces 17 cooperating with flats below the ramps 8d of the wedging strip profile.

The wedging strips may be of metal instead of plastics material. In the arrangement of FIG. 8, the wedging strips 4a and 5a are strips of sheet metal folded into angled shape with wedge faces 18 for use with channel sections such as described with reference to FIGS. 1 to 5. Mating ribs 19 and grooves 20 are formed on the contacting back surfaces of the wedging strips to ensure alignment.

In some cases it is convenient to loop the end edge of a polythene sheet round one only of the two wedging strips to tension the sheet by pulling on the end edge, which then rises upwardly between the two strips. Two sheets, respectively wrapping the two strips and issuing upwardly and together between the strips, can be anchored and individually tensioned in this way. The mating ribs 19 and grooves 20 then serve the additional purpose of biting on the clamped sheet or sheets.

For canopies, hoods and the like there may be employed a string of short metal channel sections as already described bonded or riveted to a rubber cord belt. With the aid of plastics wedging strips as previously described and of relatively long length, sheet material can be held along a straight or curved line, looped round the wedging strips extending through the string of channel sections. Retention of sheet material along a curved line is alternatively possible by bending relatively long lengths of channel section to the desired shape, saw cuts or cut-out notches being formed as necessary for the bending of the channel section. The wedging strips being flexible conform to the curvature of the channel section.

In the embodiments described, the wedging strips of angle section provide an upper flange (flange 7 in FIGS. 1 to 5) for convenience in pressing down and sometimes lifting up the wedging strips. An angle section is not essential and other formations at the projecting edge of the wedging strip may be adopted.

I claim:

1. Retention means for gripping and tensioning sheet material comprising metal strip of uniform channel section, the channel-section flanges extending in initially generally parallel relation from the roots thereof and then being inclined inwardly to terminate in parallel end portions to define a slot, and extruded flexible plastics strip material of uniform angle section, the angle section providing a thin narrow flange and a wider flange stepped on its inner face to increase in thickness from a thin root portion to a thicker parallel-walled portion and then to a bulbous ramp-sided end portion, such that two co-extensive lengths of the plastics strip material with the outer wide-flange faces thereof in contact form a split wedge around which the sheet material can be looped within the channel-section strip and gripped by wedging action of the bulbous portions of the plastics strips against the channel-section flanges at the inwardly-inclined parts of said flanges, the two lengths of plastics strip being insertable in succession through said slot to leave the narrow flanges protruding out of the slot for manipulation to move the bulbous portions in the channel-section strip.

2. A retention device for sheet material comprising a wedge the thin end of which is extended for manipulation, the wedge including the extension thereof including two parts for successive insertion through a slot with sheet material wrapping surfaces of the wedge, each of said parts of the wedge being formed from moulded plastics strip material of angle section of which one flange profile is stepped from a small thickness adjacent the flange root to a larger uniform thickness and then by a ramp to a still thicker bulbous portion. directed wedged 3. A retention device for flexible sheet material comprising a strip support member of channel section with opposed inner inclined surfaces converging to define a slot and at least two separate retaining strips insertable in succession through the slot, together to make up a ramped cross section for looping and wedging the sheet material in the support member, with each of said retaining strips projecting from the slot for manipulation, said ramped cross section of said strips being defined by surfaces that are disposed one on each strip and are direced away from each other and that have the same inclination as the first-mentioned inclined surfaces and that have portions spaced apart a distance greater than the width of said slot when said retaining strips are edge in said slot.

4. A retention device according to claim 3, wherein the converging inner surfaces of the channel section have parallel surface extensions at the slot.

5. A retention device according to claim 3, wherein the retaining strips are of moulded plastics material of angle section of which one flange profile is stepped from a small thickness adjacent the flange root to a larger uniform thickness and then by a ramp to a still thicker bulbous end portion.

6. A retention device according to claim 3, including means for interposition between the retaining strips for expanding the wedge formed thereby.

7. A retention device according to claim 3, including a capping strip for covering the retaining strips projecting from the slot.

* * * * *